(12) United States Patent  
Mikšik

(10) Patent No.: US 6,702,312 B1
(45) Date of Patent: Mar. 9, 2004

(54) UNIVERSAL FOLDING BICYCLE

(76) Inventor: Pavel P. Mikšik, Královianky 5, 931 01 Samorin (SK)

( * ) Notice: Subject to any disclaimer, the term of this patent is extended or adjusted under 35 U.S.C. 154(b) by 0 days.

(21) Appl. No.: 10/129,454

(22) PCT Filed: Nov. 24, 2000

(86) PCT No.: PCT/SK00/00025
§ 371 (c)(1),
(2), (4) Date: May 3, 2002

(87) PCT Pub. No.: WO01/38165
PCT Pub. Date: May 31, 2001

(30) Foreign Application Priority Data

Nov. 26, 1999 (SK) ............................................. 1621-99

(51) Int. Cl.⁷ ................................................. B62K 3/02
(52) U.S. Cl. ...................................... 280/287; 280/278
(58) Field of Search ................................ 280/287, 275, 280/276, 277, 278, 288

(56) References Cited

U.S. PATENT DOCUMENTS

| | | | |
|---|---|---|---|
| 4,634,138 A | | 1/1987 | Fryer et al. |
| 5,451,071 A | * | 9/1995 | Pong et al. .............. 280/281.1 |
| 5,836,602 A | * | 11/1998 | Wang .......................... 280/287 |
| 6,267,401 B1 | * | 7/2001 | De Jong ..................... 280/287 |
| 6,279,935 B1 | * | 8/2001 | Wagner ...................... 280/287 |
| 6,354,618 B1 | * | 3/2002 | Liao ............................ 280/287 |
| 6,450,521 B1 | * | 9/2002 | Turner ........................ 280/284 |
| 6,517,096 B2 | * | 2/2003 | Yih ............................. 280/283 |

FOREIGN PATENT DOCUMENTS

DE 43 13 831 11/1994

* cited by examiner

*Primary Examiner*—Lesley D. Morris
*Assistant Examiner*—Tony Winner
(74) *Attorney, Agent, or Firm*—Oppedahl & Larson LLP

(57) ABSTRACT

The universal folding bicycle according to the invention has the front arm (1) that is attached to the head assembly (2) on the frame (3) where the front swing arm (4) with the front wheel (22) are attached. The freely adjustable handlebars (9) are attached. The freely adjustable handlebars (9) are attached to the head assembly (2) via the rotary joint (5), the telescopic rod (6) and the handlebar axis (8) or via the handlebar attachement (7). The back wheel (13) is attached to the back swing arm (10) connected to the central assembly (11) formed by the pedals and cranks 12) and mounted on the frame (3). The back swing arm (10) can be equipped by the accessory arm (26). The seat (16) on a telescopic stem (15) is attached to the end of the frame (3) or via the pin (14) to the beginning of the frame (3). The seat (16) may be located in the swing arm (23) and may be equipped by the telescopic seat springing (24) or by the arm springing (25). The front arm (1) and the swing front arm (4) are interconnected by the telescopic front wheel springing (18) or by the front wheel springing (19). The back swing arm (10) is connected to the end of the frame (3) via the back wheel telescopic springing (20) or by the back wheel springing (21). The front wheel (22) and the back wheel (13) are attached by the means of unilateral free bearing to the front swing arm (4) and to the back swing (10). The telescopic front wheel springing (18), the front wheel (19), the rotary joint (5), the telescopic back wheel springing (20), the back wheel springing (21), the handlebar axis (8), and the cranks with pedals (12) are all equipped by quick releases (18', 19', 5', 20', 21', 8', and 12'). The bicycle is folded by releasing the quick releases (5', 8', 12', 18', 19', 21', 21'), swinging the handlebars, the front wheel (22), the back wheel (13) and the seat (16) after sliding it out together with the telescopic stem (15) towards the frame (3). The bicycle design according to this invention permits production of all types of bicycles ranging from sport bikes to common utility ones for adults as well as for children.

22 Claims, 13 Drawing Sheets

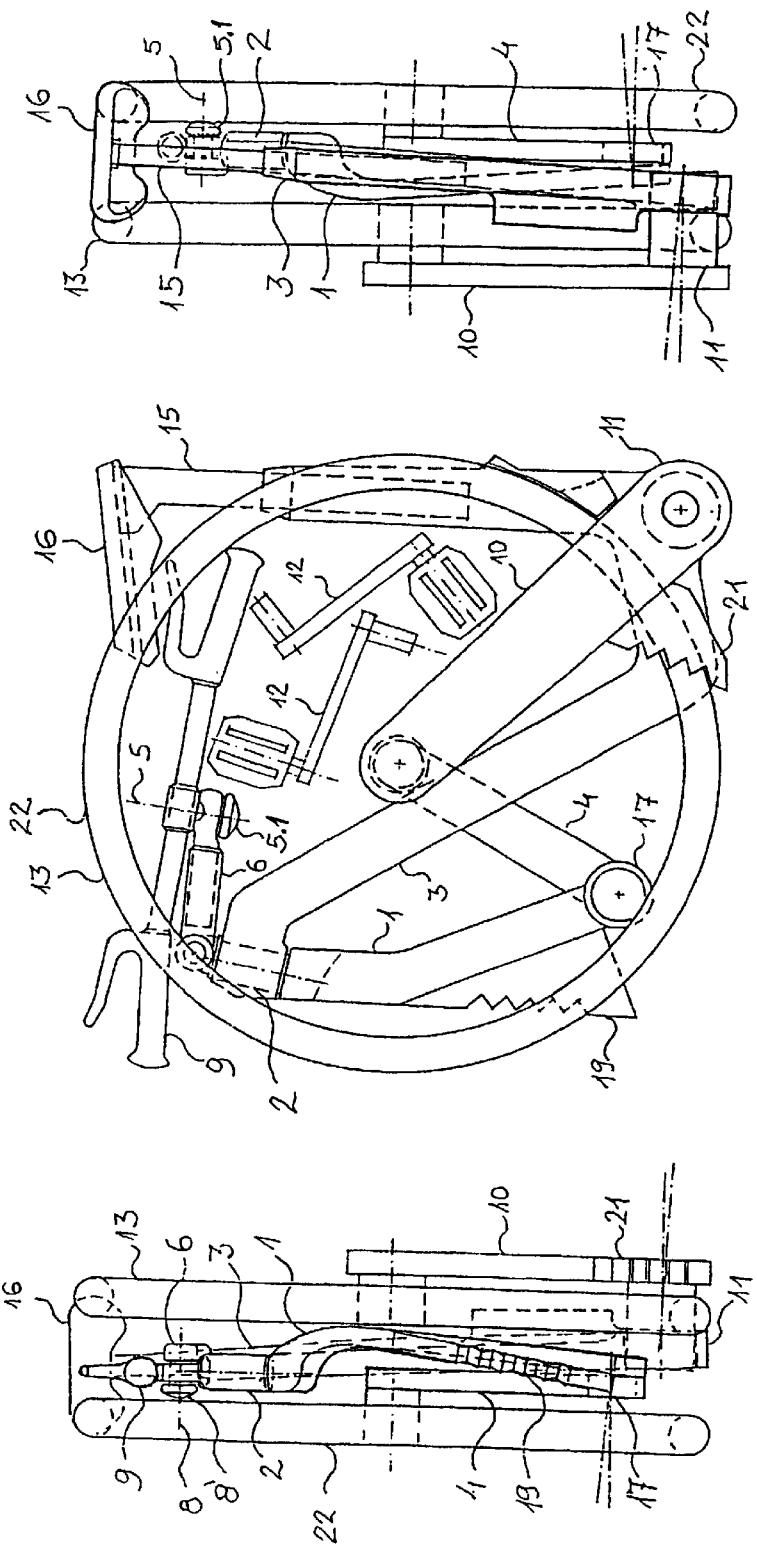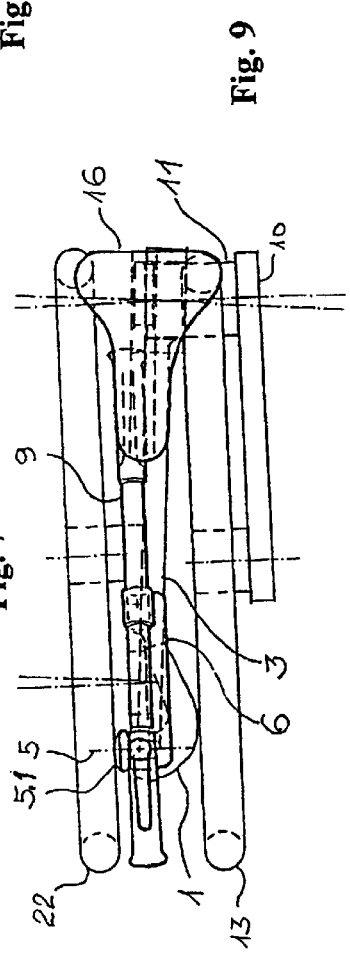

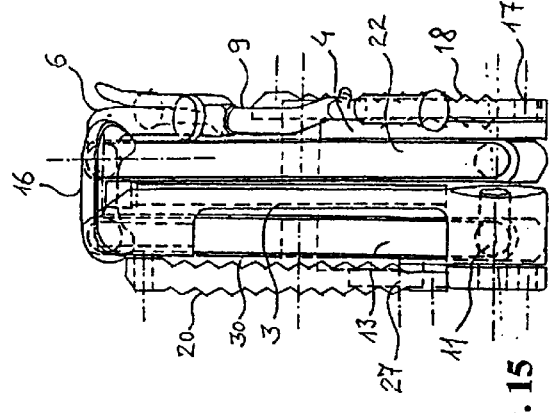
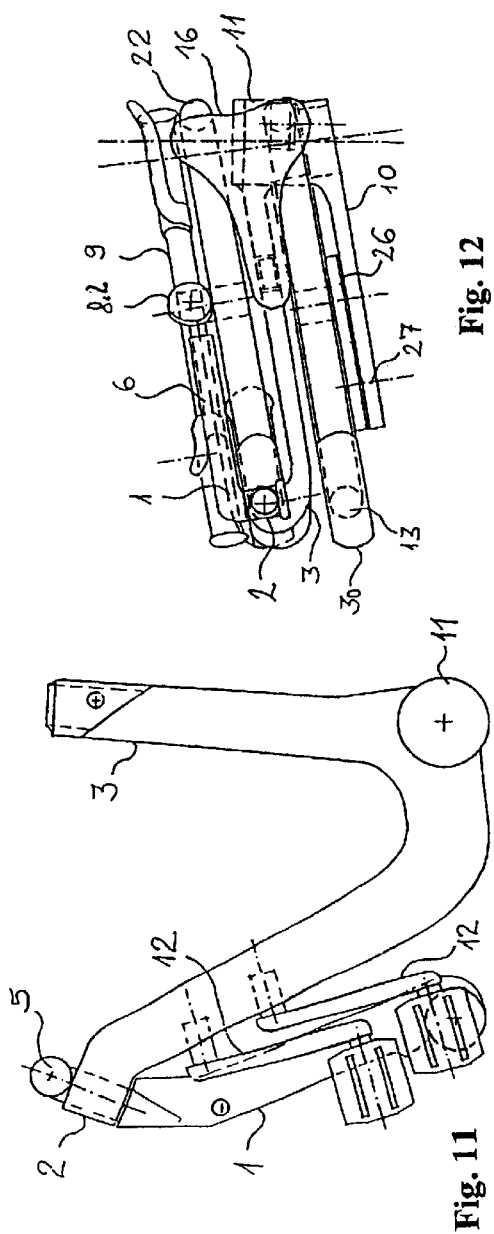
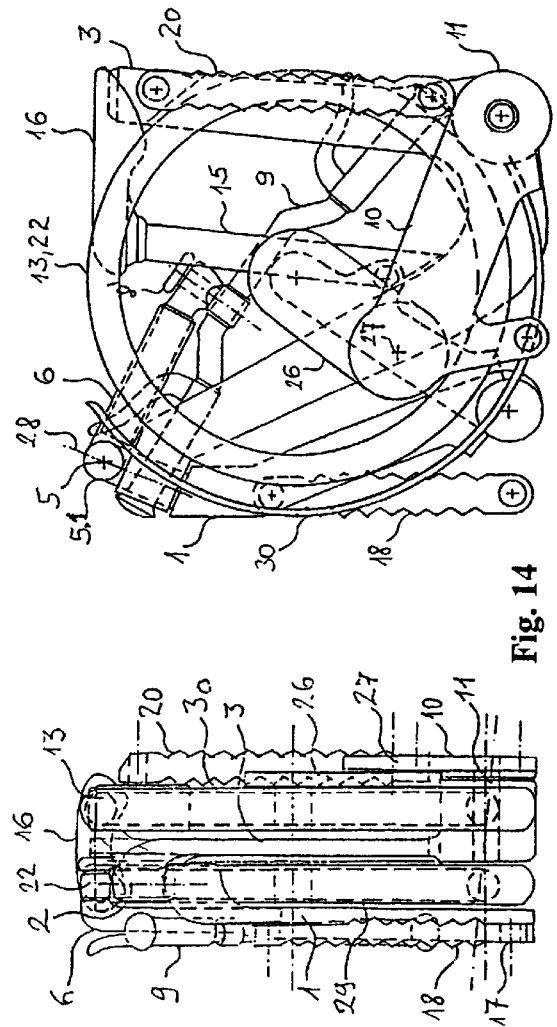

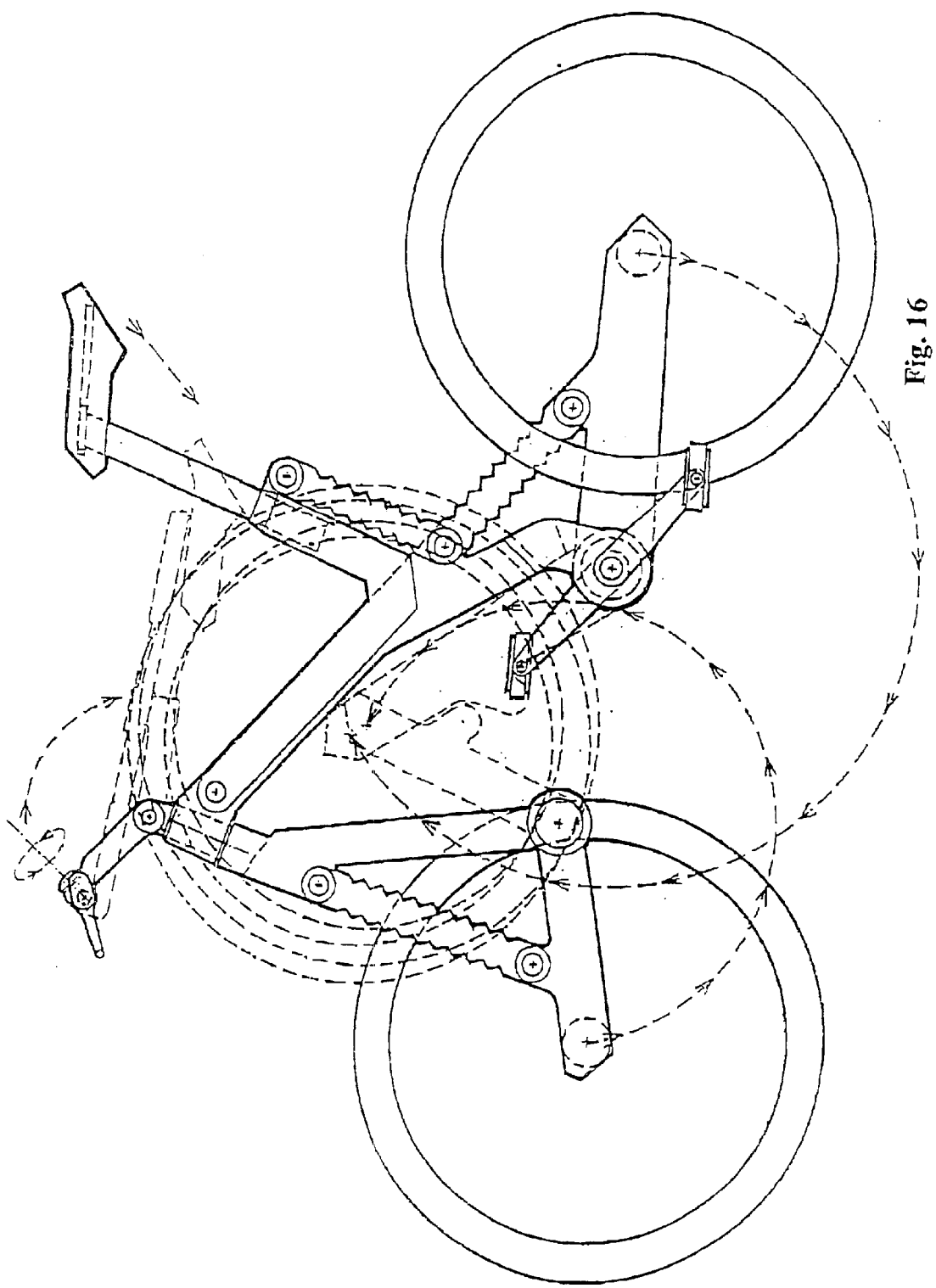

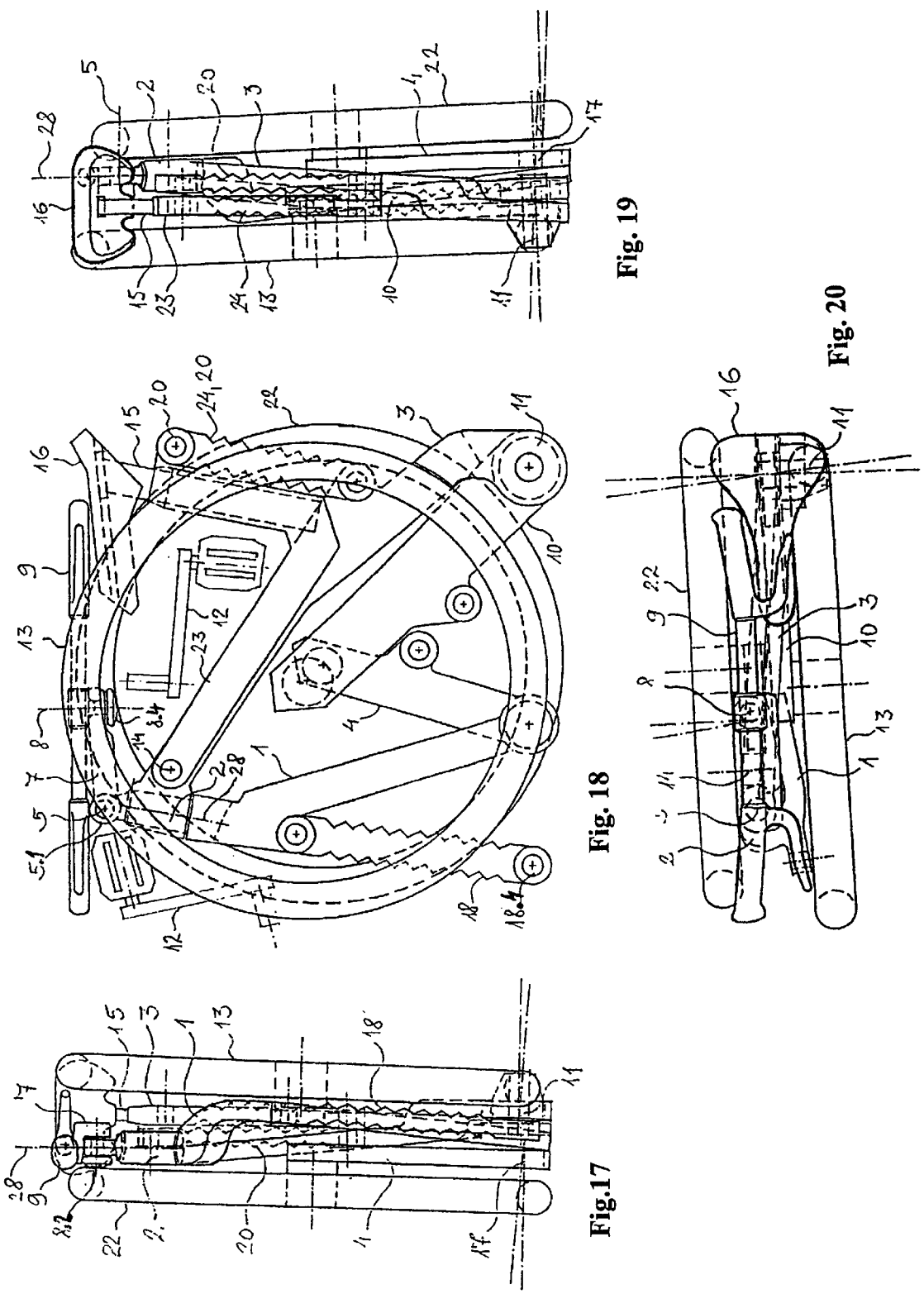

UNIVERSAL FOLDING BICYCLE

FIELD OF THE INVENTION

The invention concerns a universal folding bicycle.

BACKGROUND OF THE INVENTION

Currently known types of folding bicycles are designed in a way that enables their folding into a pack with the size corresponding to the height of the bicycle or smaller.

Bicycle folding to the size of its construction is described in WO 97/10141. It is a common type of men's bicycle. It is folded by rotating the back wheel with the back fork consisting of the chain support together with the central part of the bicycle toward the front wheel. The seat is swung backwards while the handlebars and pedals remain in their original positions. The folding is time consuming, requires tools and the folded bicycle is of an unpractical size.

A common men's bike with common-type wheels is described in U.S. Pat. No. 5,125,678. Its design enables fairly quick folding by removing both wheels, disconnecting the back fork and swinging the seat support forwards to the seat tube. Folding of this type of bicycle requires tools. Its size is inconvenient and the design makes it impossible to meet the necessary ergonomical requirements.

The bicycle according to U.S. Pat. No. 4,895,386 can be folded to a pack with the height of its construction. Its front wheel in the fork with the head assembly in the front tube, the handlebar attachment and the handlebars constitute one unit. The seat with the stem and the seat tube form the second unit. There are two diagonal joining parts between the handlebar assembly and the seat tube, which are attached by two alternating pins to the front and back units. The central assembly with pedals and back wheel is attached to the lower joining part. The bicycle is folded by rotating the joining parts at the pins. In this step the bicycle is shortened so that the back part will align to the front part with the handlebars. The pedals and the handlebars are not folded; they remain in the original width. The disadvantages of this design are the small diameter of wheels, the open chain, and a comparatively large size after folding.

A bicycle, which can be folded into a smaller size, is described in U.S. Pat. No. 5,205,573. It is described as a common men's bike with wheels of normal size. Its folding is based on a back fork that can be divided at the place where the seat support attaches to the chain support. After removing both wheels, the back fork is divided and the seat support is swung forward to the seat tube around a pin located under the seat. The chain support is swung forward to the front fork around a central pin. Rotating the handlebars 90 degrees completes the folding. Even if it is possible to fold it into a comparatively small size, the procedure is time consuming and requires experience. Tools are necessary. The bicycle design has limited variability. These are the reasons that make this design useless for the common customer.

U.S. Pat. No. 4,634,138 describes a bicycle that has a frame, a prolonged handlebar attachment and a prolonged seat stem with a circular profile. The wheels have small diameters. The whole design makes the impression of a scooter with pedals and handlebars. Folding of this bicycle requires tools, folding of the pedals is dangerous, the driving chain is open, and the design variability is limited.

The bicycle according to U.S. Pat. No. 4,598,923 can be folded to the size of a suitcase. This bicycle has wheels with small diameters. Its folding includes sliding the front wheel into the hollow part of the frame after releasing the accessory pins and rotating the front wheel backwards. The back wheel is slid into the second part of the frame after releasing the accessory pins and rotating the back wheel forwards. The handlebars are folded to the back after releasing the pins on the handlebar attachment. The hollow parts of the frame and the prolonged hollow part of the seat column will create a suitcase by folding them one upon another. The pedals are removed and placed into this suitcase. The disadvantage is that the bicycle wheels have a small diameter and the resulting rolling resistance is too great for a rough terrain. The construction itself has sharp edges, which cause a high risk of injury.

The folding bicycle with wheel springing is described by DE 4313832. Its principle is that it has a rotary embedded swinging lever of back wheel which is spring-loaded against the main frame. The lever can be rotated forwardly. The folding mechanism of front wheel swinging lever serves to the front wheel placing. The size of this folded bicycle does not provide the travel comfort.

The principal disadvantages of the bicycles described above are: small diameters of wheels, open chain, comparatively large size of the folded bicycle, time and expertise requirements when folding, necessity to use tools, low stability of the bicycles, and the lack of springing of wheels and seat.

DESCRIPTION OF THE INVENTION

The universal folding bicycle eliminates the disadvantages of the current designs. It consists of a frame, handlebars, wheels, a seat, and a central assembly with pedals and cranks. The front swing arm with the front wheel is attached to the front arm connected to the head assembly. Adjustable handlebars are attached to the head assembly by the means of a rotary joint, a telescopic handlebar rod or a handlebar attachment. The back wheel is attached to the back swing arm. The back swing arm is connected to the central assembly mounted on the frame that includes pedals with cranks. The seat on a telescopic stem is mounted on the back part of the frame or on the front part of the frame using a pin. The front arm and the front swing arm are interconnected by the front joint or by the telescopic springing of the front wheel or by the front wheel springing. The back swing arm is connected to the frame end by the back wheel telescopic springing or by the back wheel springing. The front wheel is attached to the front swing arm by the means of a unilateral free bearing. The back wheel is attached in the same way to the back swing arm which can be equipped by an accessory arm. The front wheel telescopic springing or the front wheel springing, the rotary joint, the telescopic springing of the front wheel or the front wheel springing, the handlebar axis and the cranks with pedals are all equipped by quick releases.

The seat can be placed into the seat swing arm. It may be equipped by a telescopic seat springing or by a seat arm springing. The telescopic seat springing is mounted on the end of the frame and the seat arm springing is mounted on the central part of the frame.

The height of handlebars can be adjusted by a telescopic handlebar rod in the range of 600 to 1100 mm from the ground and to the distance of 290 to 620 mm from the seat in the horizontal direction.

The distance of frame at the traverse part from the ground can be 150 to 780 mm. The seat can be adjusted in the range of 70 to 150 mm in the anterior-posterior horizontal direction, and 500 to 1100 mm from the ground in the vertical direction. There may be a springing from 55 to 125 mm from the ground.

The handlebar axis permits to limit the handlebar positioning and, subsequently, to stabilize it in a desired position.

The front and back wheels may have a springing from 55 to 210 mm and the steering angle may range from 65 to 80 degrees.

The axle base of the front and back wheel may range from 600 to 1210 mm.

Folding of the bicycle is done in the following way: After releasing the handlebar quick release the handlebars are rotated 90 degrees to the vertical position. The quick release of the rotary joint is released and the handlebars are swung upwards in mountain bikes or backwards in all other bicycle types. Then the front wheel telescopic springing quick release or the front wheel springing quick release is released and the front swing arm with the front wheel, fender, and front wheel telescopic springing or front wheel springing are swung to the centre of the frame. The seat is swung to the centre as well after sliding out of the telescopic stem or the telescopic stem located in the seat swing arm and equipped by the telescopic seat springing or by the seat arm springing.

The back wheel together with the back swing arm optionally equipped by the accessory arm is swung to the centre of the frame after releasing the quick release.

The pedals with cranks located 260 to 350 mm from the ground are removed after releasing their quick releases. Folding of the bicycle does not require strict adherence to the described procedure. We can begin to fold any part of the construction. Reversing the described steps does unfolding.

The folded bicycle is a square with a size equal to the diameter of wheels, or wheels with fenders. The bicycle can be folded without any tools.

The bicycle described in the invention has a complete springing of its both wheels, seat, and handlebars. It permits to vary positions of all parts that are important for the ergonomy and construction, including the distance of the central assembly from the ground, the steering angle, the front wheel track length, the axle base, and the handlebar and seat positions. Therefore, it allows the production of functionally diverse bicycle types ranging from bikes for children, ladies bikes and sport road bikes to mountain bikes. Ladies bicycles are safe, with stable steering and their design parameters permit a comfortable ride even on a boulder pavement of historical centres. There are alternate gears located in the back swing arm that permit ride to a slope and in a rough terrain.

City bikes have a frame placed low above the ground so that it is comfortable to mount and to descend. That is why it is suitable for riding for sport, fun, to school, work and shopping, in and outside of towns.

Mountain bikes are intended for a sport rides on and off road. It can be adjusted perfectly to the weight and height requirements of adults.

Road bikes are intended mainly for sports on reinforced roads for demanding riders. It is possible to adjust the handlebars to a lower position enabling fast racing-style ride or to an upper position for a recreational sport ride on narrow racing tires. It permits a fast and comfortable ride with little rolling resistance. The seat with springing enables to increase the comfort when riding on paved roads.

Different variants of city, sport or mountain bikes for children can be used for the same purposes as the corresponding bicycle types for adults. They, too, permit variability of positions of parts important for ergonomy and construction.

Another advantage of the invention is that it enables production of bicycles with wheel diameters suitable for individual bicycle types. Its size after folding corresponds to a square with sides equal to the diameter of wheels, or wheels with fenders. It can be folded without any tools. It can be folded to the size of a suitcase that permits simple transport as a personal luggage by car, bus, train, airplane, boat, or in an elevator. Folding of the bicycle does not require any expertise and the folding time is not more than 2 minutes.

DESCRIPTION OF THE FIGURES ON THE SHEETS

Examples of application of the invention that are subject to patent protection are shown on the enclosed figures.

FIG. 6 is a front view,

FIG. 7 a side view,

FIG. 8 a back view, and

FIG. 9 a view from above of a folded ladies bike.

Figure 10:
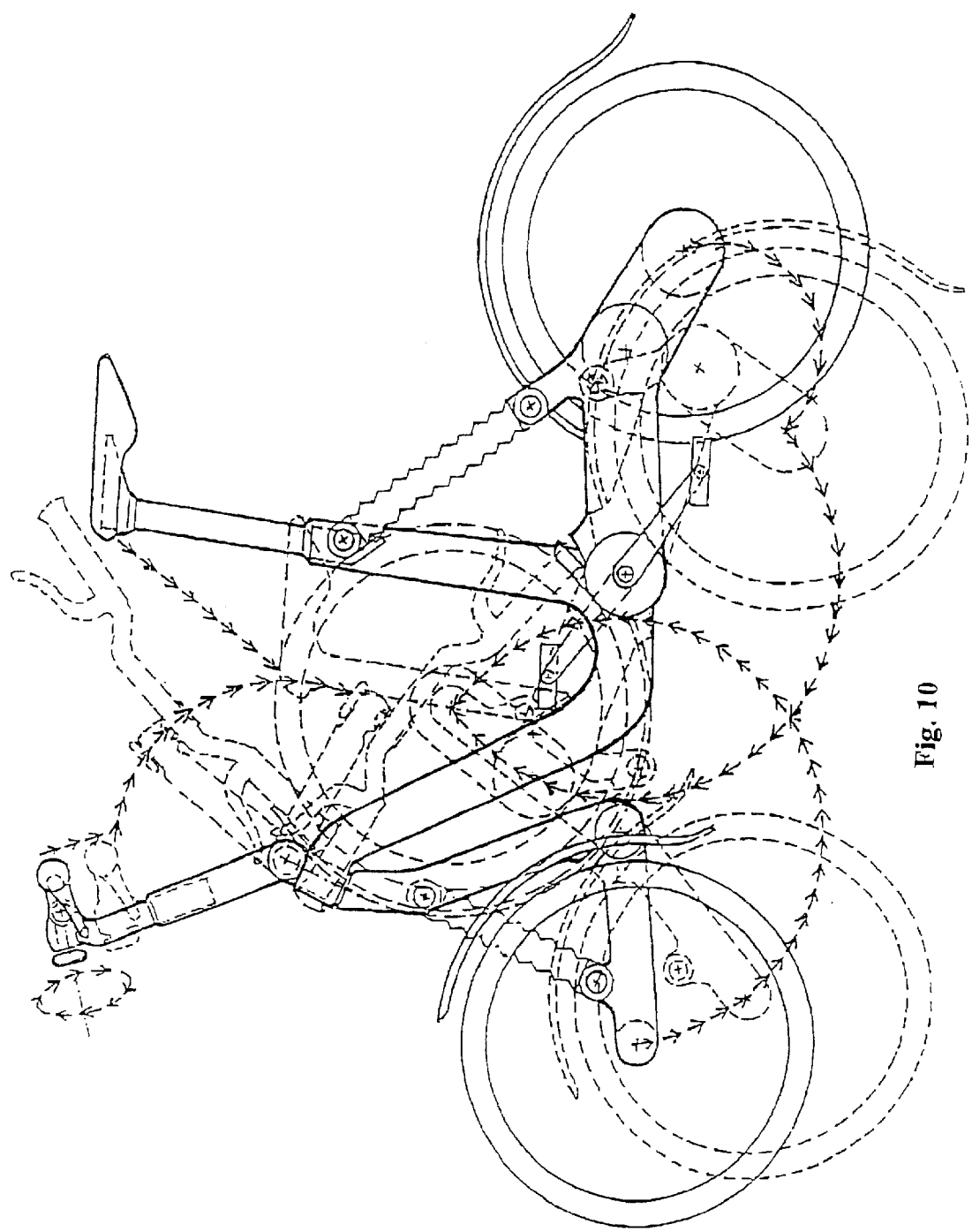

FIG. 10 shows a side view of the folding of wheels, handlebars and seat of a city bike, FIG. 11 is a side view of the frame with folded pedals.

FIG. 12 is a view from above,

FIG. 13 a front view,

FIG. 14 a side view, and

FIG. 15 a back view of a folded city bicycle.

FIG. 16 shows a side view of the folding of wheels, handlebars and seat of a mountain bike, FIG. 17 is a front view, FIG. 18 a side view, FIG. 19 a back view, and FIG. 20 a view from above of a folded mountain bike.

Figure 21:
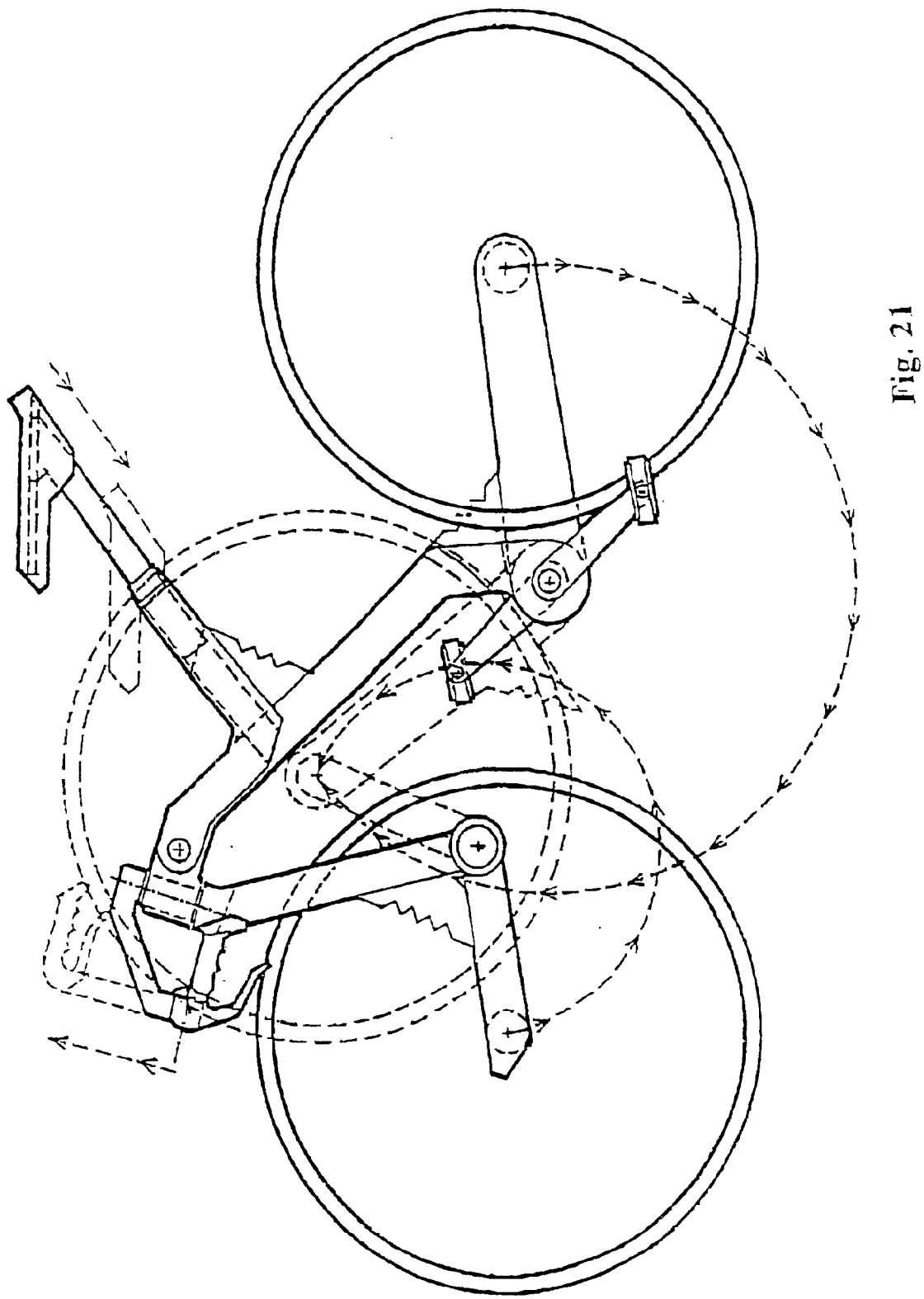

FIG. 21 is a side view of a sport road bike, folding of wheels, handlebars and seat is shown.

Figure 24:
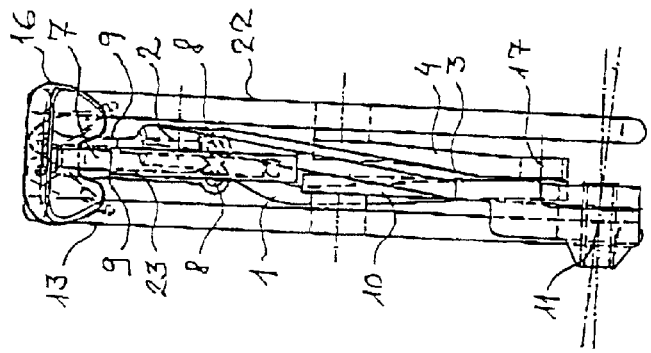
Figure 23:
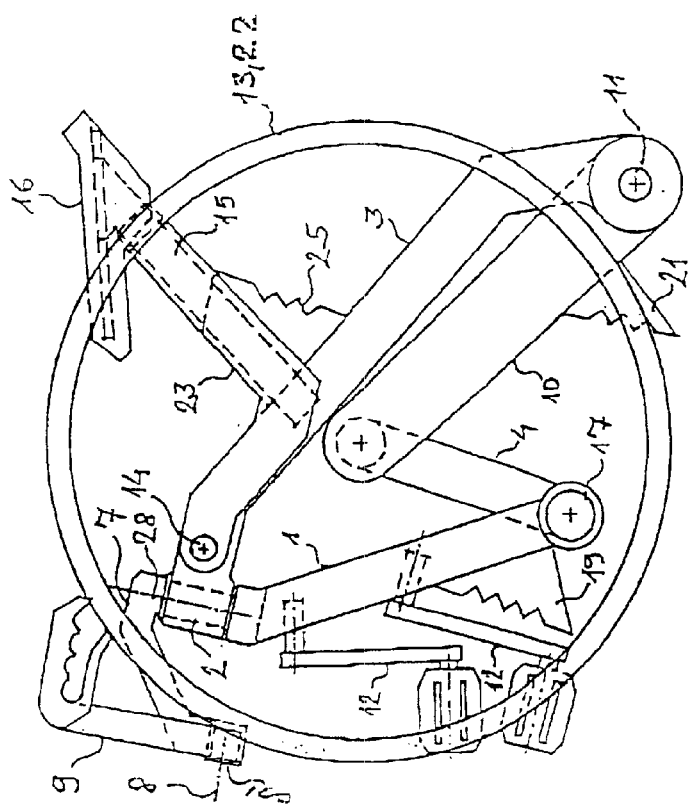
Figure 22:
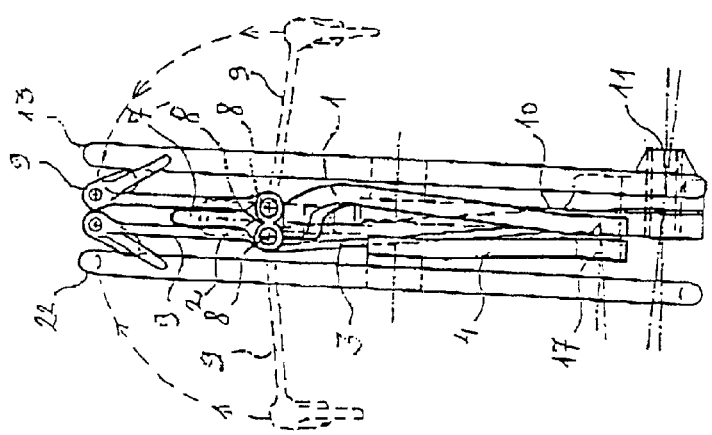

FIG. 22 is a front view,

FIG. 23 a side view,

FIG. 24 a back view, and

Figure 25:
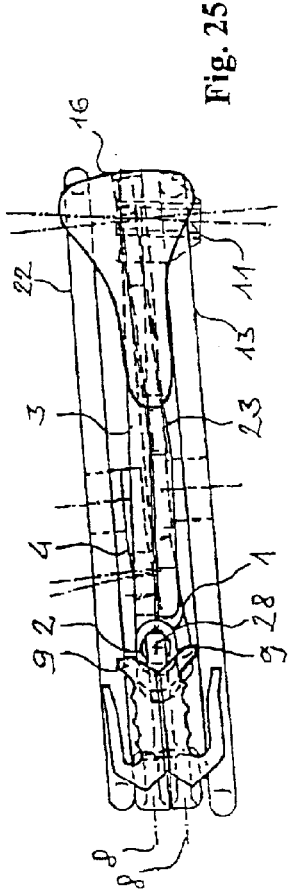

FIG. 25 a view from above of a folded sport road bicycle.

Figure 26:
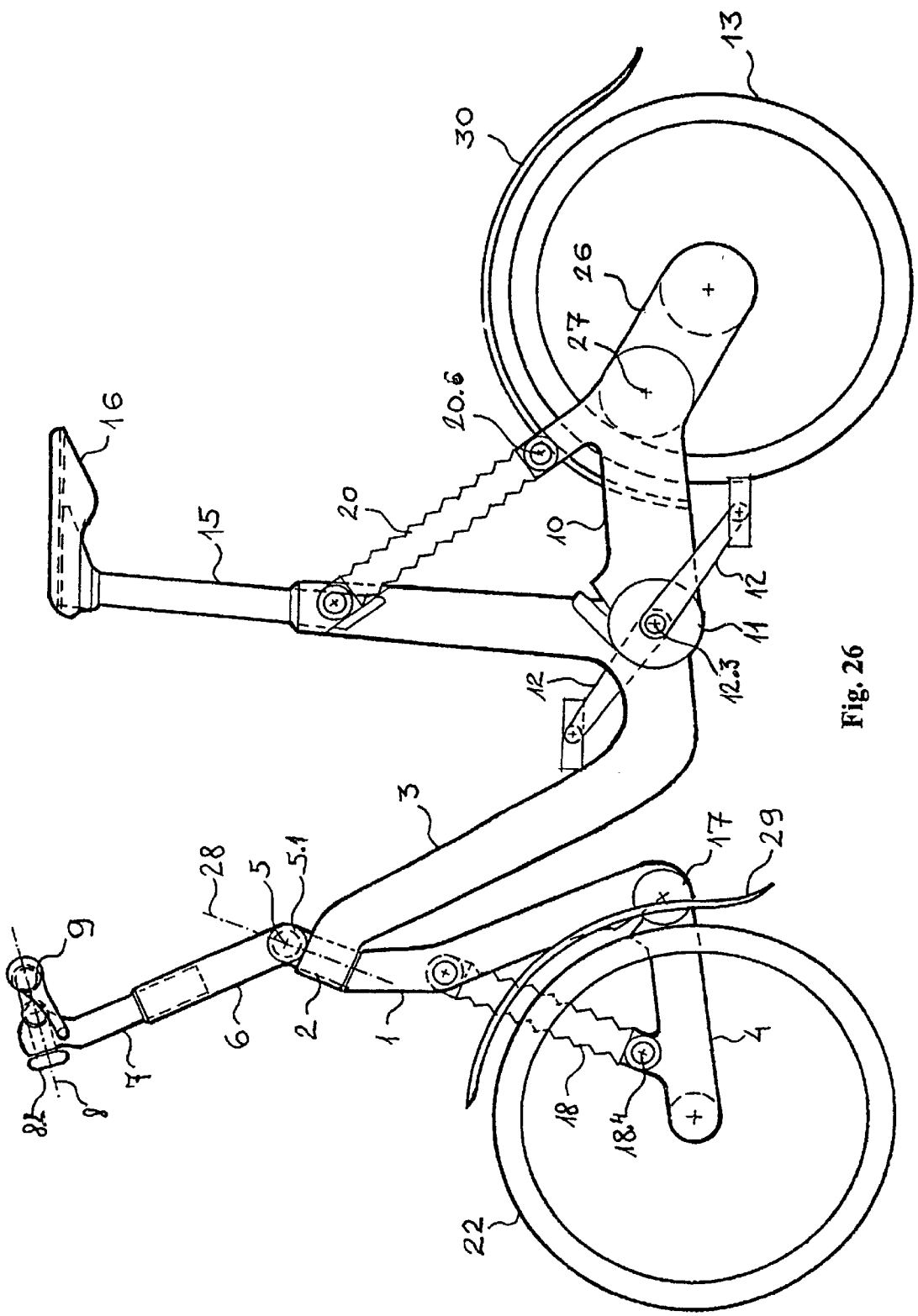

FIG. 26 is a side view of a bicycle according to an embodiment of the invention.

EXAMPLES OF APPLICATION OF THE INVENTION

Example 1

Figure 1:
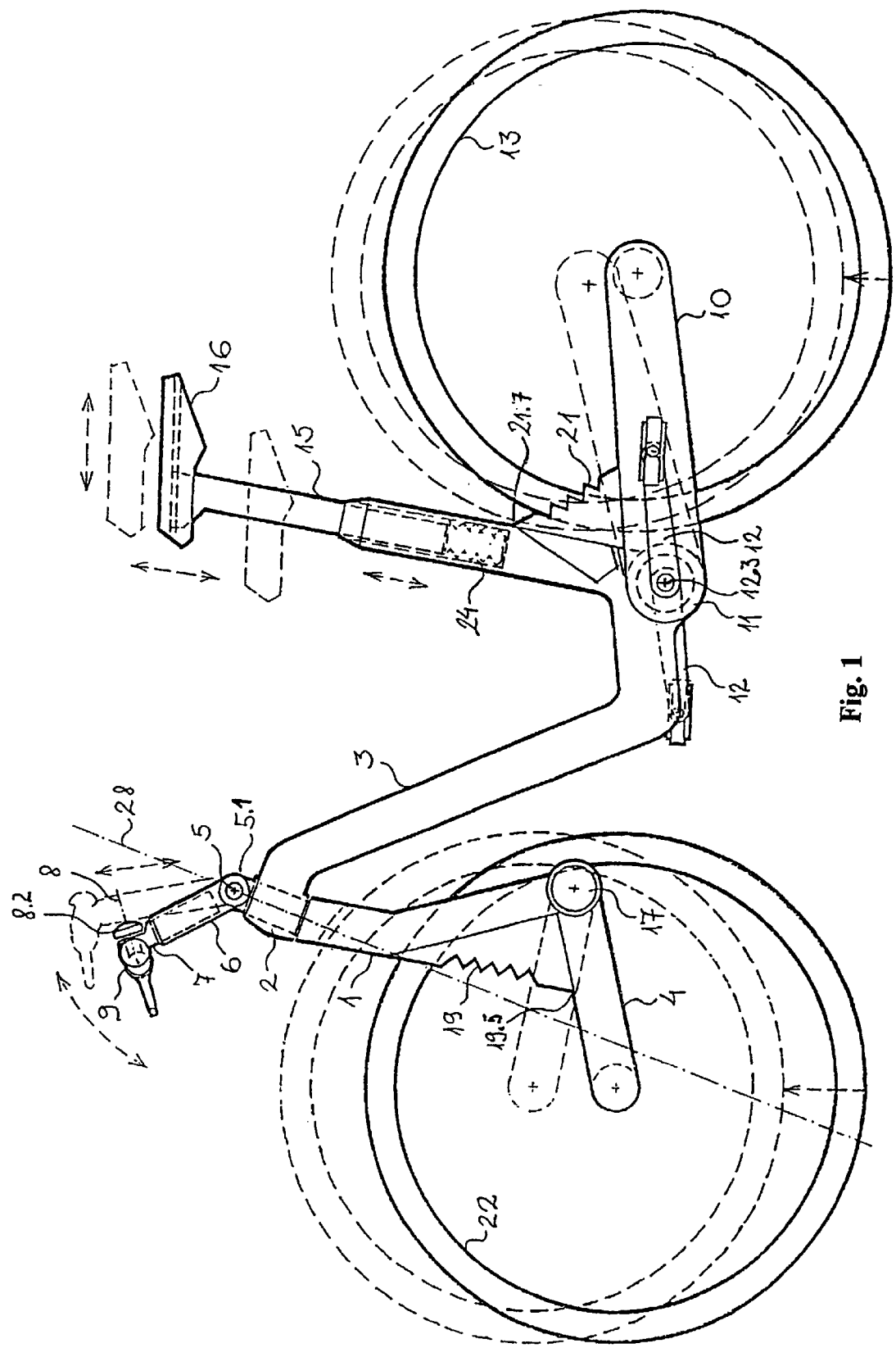
FIG. 1 shows a side view of a ladies bike. The springing of wheels and seat as well as the adjustable seat and handlebars are highlighted.

The universal folding bicycle consisting of a frame, handlebars, wheels, a seat, and a central assembly with attached pedals with cranks as shown in FIG. 1 is a ladies bike. Its design is characterized by the attachment of the front swing arm 4 by the front joint 17 to the front arm 1, which is connected to the head assembly 2 of the frame 3. The front arm 1 and the front swing arm 4 are interconnected by front wheel springing 19 with the quick release 19.5. The adjustable handlebars 9 are mounted on the head assembly 2 via the rotary joint 5 with the quick release 5.1 and the telescopic rod 6. They are attached to the handlebar axis 8 by a quick release 8.2.

The back swing arm 10 is mounted on the central assembly 11 that is formed by the pedals with cranks 12 and the quick release 12.3. It is located on the frame 3. The seat 16 is located on the frame 3, which ends by the telescopic stem 15 and telescopic seat springing 24. The back swing arm 10 and the end of the frame 3 are connected by the back wheel springing 21 with the quick release 21.7. The front wheel 22 and the back wheel 13 are attached by the means of a unilateral free bearing to the swing front arm 4 and the back swing arm 10, respectively.

The folding of the wheels, handlebars, and seat and different views of the folded ladies bike are shown in FIGS. 5 to 9. The bicycle is folded by releasing the handlebar axis quick release 8.2 and rotating the handlebars 9 by 90 degrees to the vertical position. Then the rotary joint quick release 5.1 on the handlebar axis 8 is released. The handlebars 9 are swung back until stop. The seat 16 is swung so that it can be slid in together with the telescopic stem 15 and the telescopic seat springing 24. Then the seat is moved forward horizontally until stop. The front wheel 22 is swung down after releasing the quick release 19.5. The front swing arm 4 with the front wheel 22 is rotated in the front joint 17 into the centre of the frame 3. The back wheel 13 is swung down after releasing the back wheel springing quick release 21.7. Then it is rotated around the central assembly 11 to the centre of the frame 3. Finally, the quick release of the pedals with cranks 12.3 is released and the pedals with cranks 12 are slid under to the centre of the frame 3. The bicycle is unfolded by reversing the described steps.

Example 2

Figure 2:
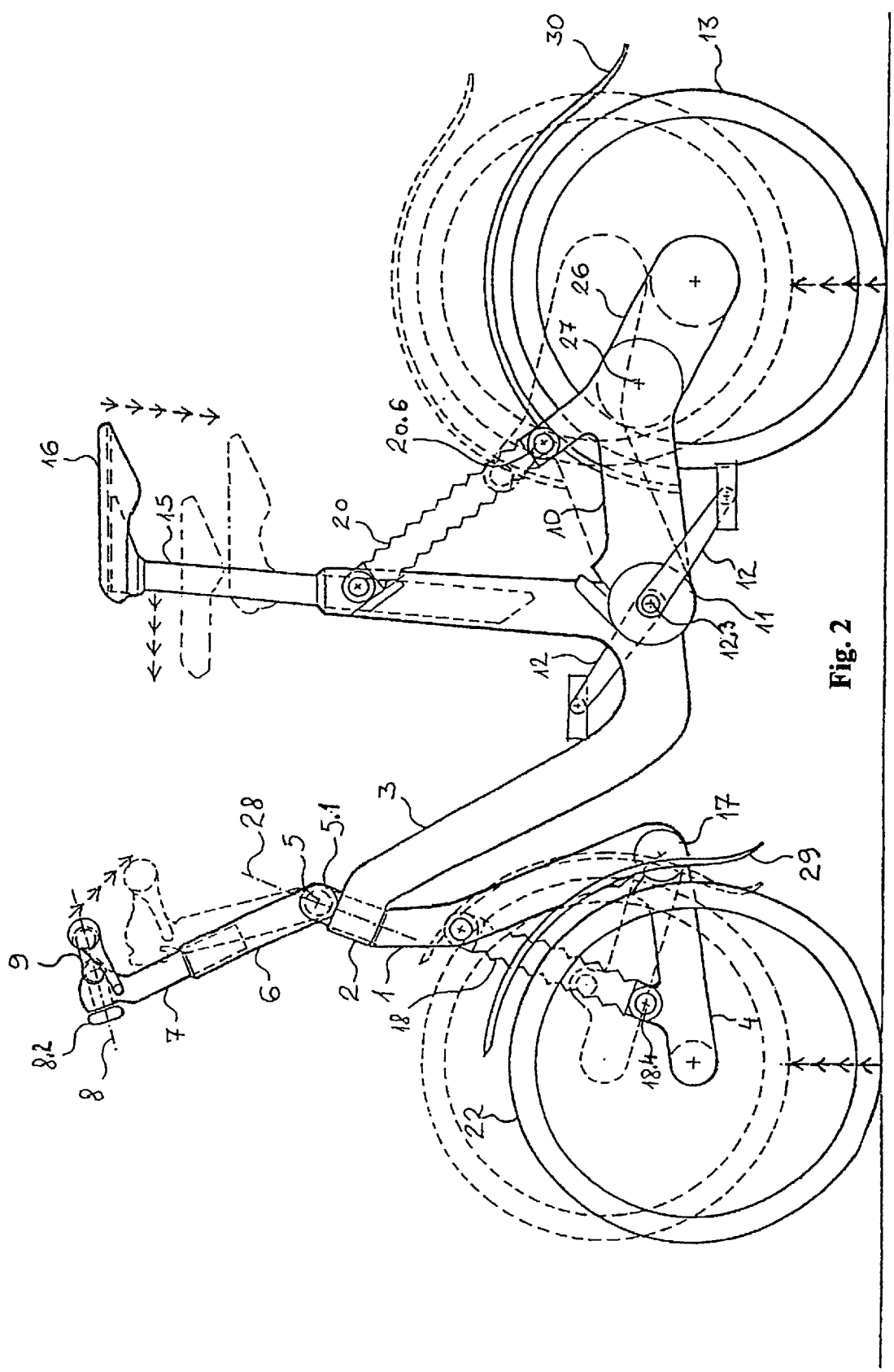
FIG. 2 shows a side view of a city bike. The springing of wheels and seat as well as the adjustable seat and handlebars are highlighted.

The design shown on FIG. 2 is a city bike that differs from the bicycle described in example 1 in that the front swing arm 4 with the front arm 1 are connected to the telescopic front wheel springing 18 and with the front wheel telescopic springing quick release 18.4. The accessory arm 26 is mounted on the back swing arm 10 via the accessory arm rotary joint 27. The back wheel telescopic springing 20 with its quick release 20.6 are attached to the back swing arm 10. Because this is a city bike, the seat 16 is not equipped by any telescopic springing 24.

The folding of the wheels, handlebars, and seat and different views of the folded city bike are shown on FIGS. 10 to 15. The bicycle is folded in a way similar to that described in example 1. The difference is that the seat 16 is swung after it is slid out together with the telescopic stem 15. Then it is inserted into the centre of the frame 3. The front wheel 22 is swung after releasing the quick release 18' and the back wheel 13 after releasing the quick release 20.6. The bicycle is unfolded by reversing the described steps.

Example 3

Figure 3:
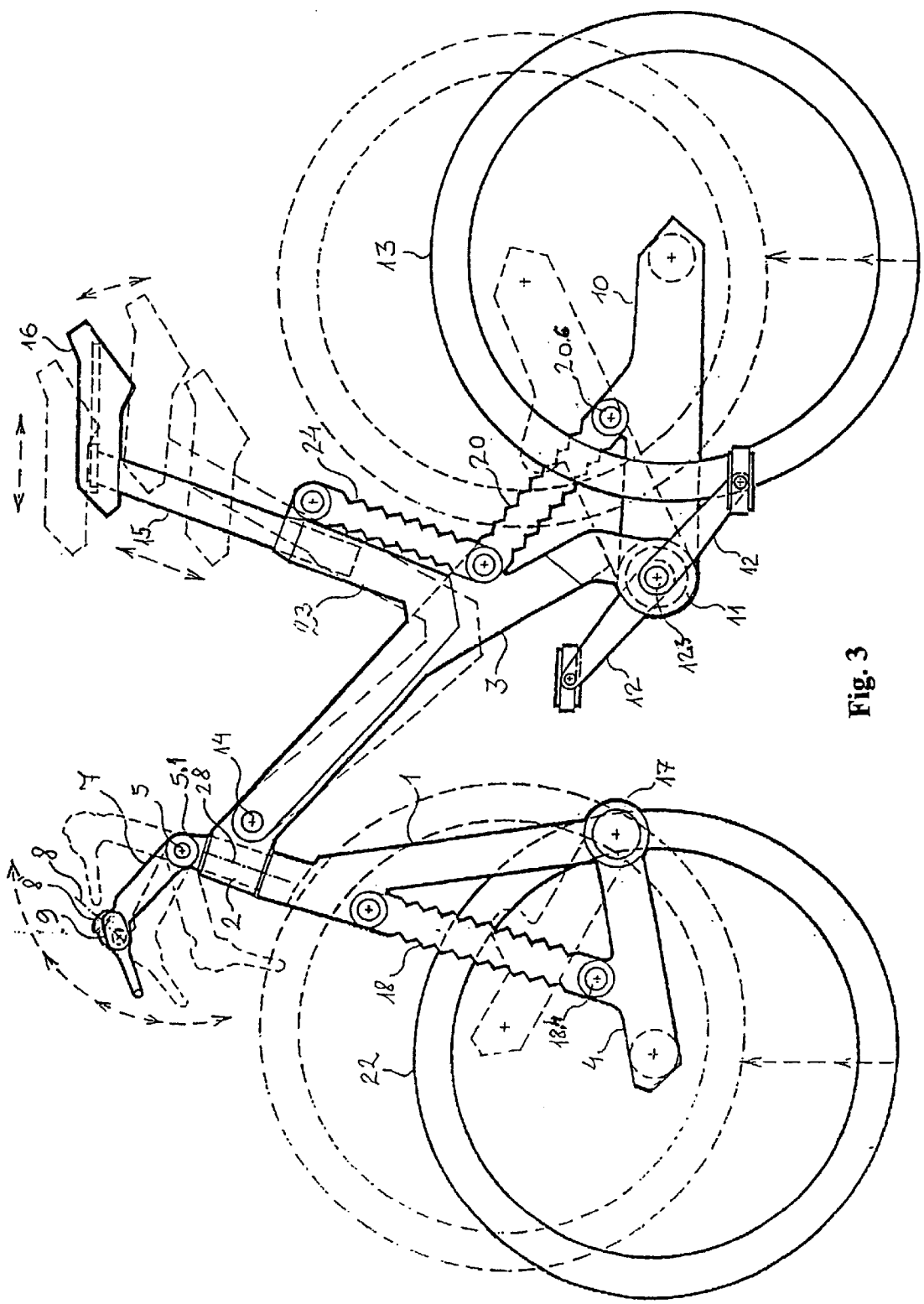
FIG. 3 shows a side view of a mountain bike. The springing of wheels, seat and handlebars as well as the adjustable seat and handlebars are highlighted.

FIG. 3 shows a mountain bike design that differs from the example 2 in that the bicycle has its handlebars 9 mounted on the head assembly 2 by a handlebar attachment 7. This bicycle lacks the accessory arm 26, however the seat 16 is equipped by the seat swing arm 23. The telescopic seat springing 24 is attached at the same place as the telescopic back wheel springing 20. Together they are connected to the frame 3.

The folding of the wheels, handlebars, and seat and different views of the folded mountain bike are shown in FIGS. 16 to 20. The bicycle is folded in a way similar to that described in example 1.

Example 4

Figure 4:
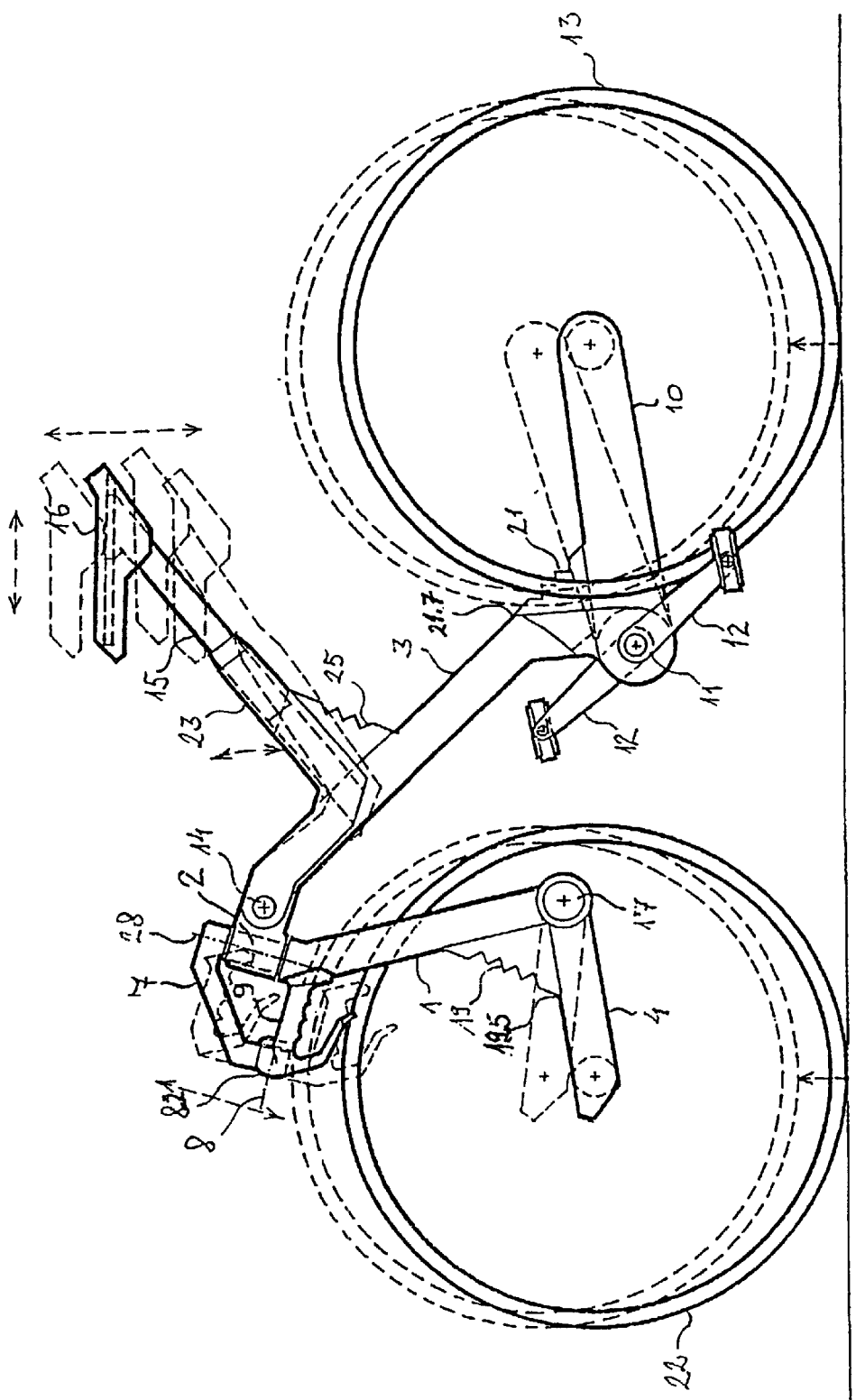
FIG. 4 shows a side view of a road bike. The springing of wheels and seat as well as the adjustable seat and handlebars are highlighted.
Figure 5:
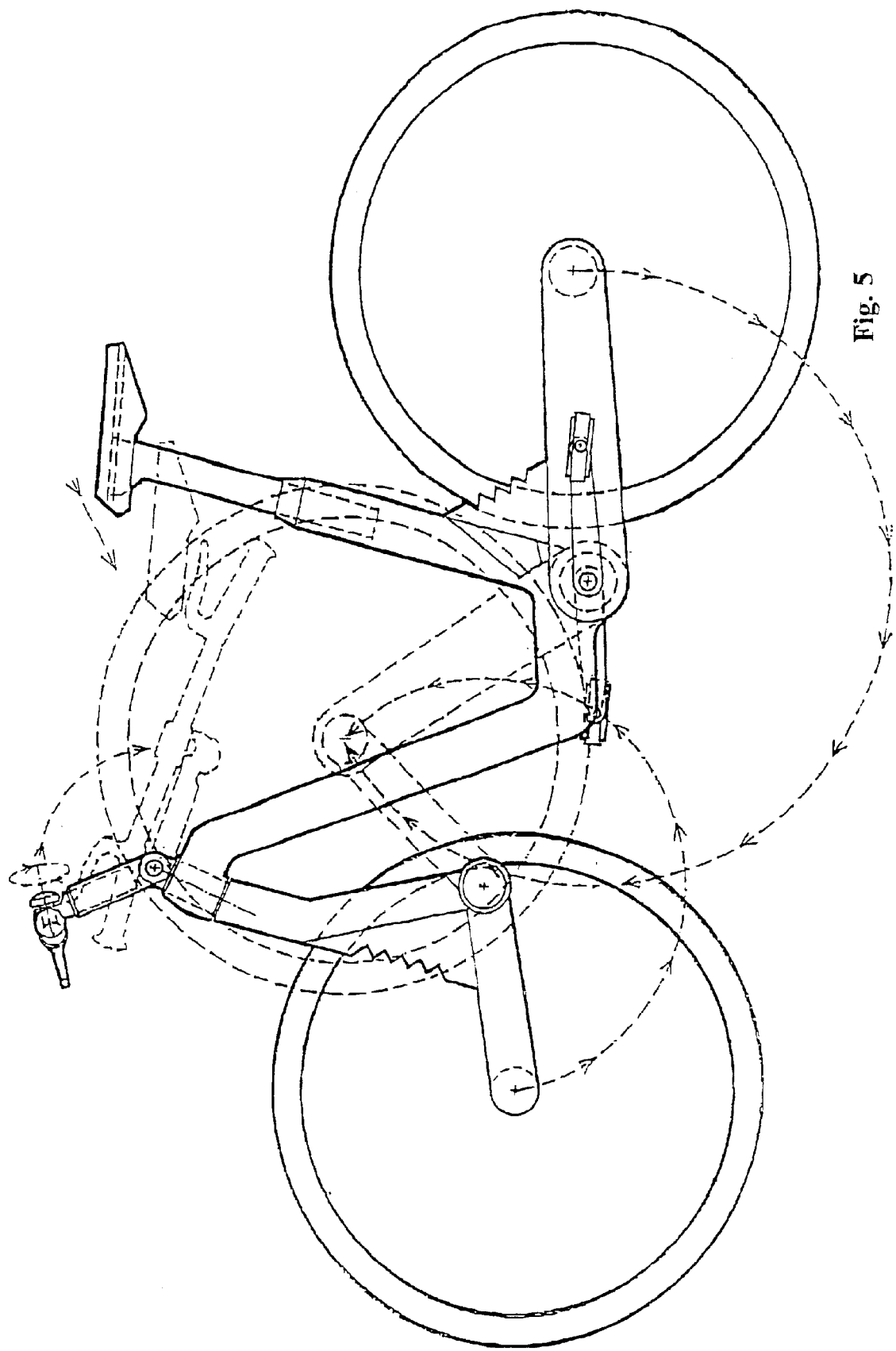
FIG. 5 shows a side view of the folding of wheels, seat, and handlebars of a ladies bike.

The design shown in FIG. 4 is a sport bicycle that differs from the design in FIG. 1 in that the handlebars 9 with the handlebar axis quick release 8.2 are mounted on the head assembly 2 by the handlebar attachment 7. The handlebars can be swung up around the handlebar axis 8. The seat 16 with the seat swing arm 23 is attached to the beginning of the frame by the pin 14. The seat arm springing 25 is connected to the centre of the frame 3. The back wheel springing 21 is attached to the back swing arm 10 and to the end of the frame 3 via its quick release 21.7.

The folding of the wheels, handlebars, and seat and different views of the folded sport road bike is shown in FIGS. 21 to 25. The bicycle is folded in a way similar to that described in example 1, with the exception that after the quick release 8.2 is released the left and right parts of the handlebars 9 are swung up around the handlebar axis 8. This permits swinging the handlebars 9 to the back until stop.

Industrial Applicability

The universal folding bicycle according to the invention is suitable for production of all types of bicycles ranging from sport to common utility bikes, bikes for adults as well as for children.

What is claimed is:

1. A universal folding bicycle consisting of a frame, handlebars, front and rear wheels, a seat, and a central assembly with attached pedals with cranks, wherein:

a front swing arm with the front wheel are attached to a head assembly of the frame at a front arm;

the freely adjustable handlebars are attached to the head assembly either via a rotary joint and a telescopic rod and a handlebar axis or via a handlebar attachment, the back wheel is attached to a back swing arm connected to a central assembly formed by the pedals and cranks and mounted on the frame, the seat on a telescopic stem is attached to an end of the frame or via a pin to a beginning of the frame, the front arm and the swing front arm are interconnected by a front joint and are sprung either by telescopic front wheel springing or by front wheel springing, the back swing arm is connected to the end of the frame and is sprung either by back wheel telescopic springing or by back wheel springing, the front wheel is attached by means of a unilateral free bearing to the front swing arm, the back wheel is attached by means of a unilateral free bearing to the back swing arm, and the telescopic front wheel springing or the front wheel springing, the rotary joint, the telescopic back wheel springing or the back wheel springing, the handlebar axis, and the cranks with pedals are all equipped with quick releases.

2. A universal folding bicycle according to claim 1 wherein:

the seat is located above a seat swing arm and is sprung by seat arm springing; and the seat arm springing is attached to the centre of the frame.

3. A universal folding bicycle according to claim 1 wherein the back swing arm is equipped with an accessory arm.

4. A universal folding bicycle according to claim 1 wherein the height of the handlebars is adjustable by the means of the telescopic rod in a range of 600 to 1100 mm from the ground and 290 to 620 mm from the seat in a horizontal direction.

5. A universal folding bicycle according to claim 1 wherein the height of the frame at a traverse part is 150 to 780 mm from the ground.

6. A universal folding bicycle according to claim 1 wherein the seat is adjustable in the anterior-posterior horizontal direction in the range of 70 to 150 mm, wherein the seat is adjustable in the vertical direction in the range of 500 to 1100 from the ground, and wherein the seat is adjustable with springing from 55 to 125 mm from the ground.

7. A universal folding bicycle according to claim 1 wherein the handlebar axis limits the positioning of handlebars and subsequent stabilization in one of a plurality of defined positions.

8. A universal folding bicycle according to claim 1 wherein the height of the telescopic front wheel springing or the front wheel springing as well as the height of the telescopic back wheel springing or the back wheel springing is in the range of 55 to 210 mm.

9. A universal folding bicycle according to claim 1 wherein the steering angle of the front wheel is in the range of 65 to 80 degrees.

10. A universal folding bicycle according to claim 1 wherein the axle base of the front and back wheel is in the range of 600 to 1210 mm.

11. A universal folding bicycle according to claim 1 wherein the handlebars can be folded to the back or upwards after releasing the handlebar axis quick release, rotating by 90 degrees, and releasing the rotary joint quick release.

12. A universal folding bicycle according to claim 1 wherein the front swing arm with the front wheel, the attached fender and the telescopic front wheel springing or the front wheel springing can be swung to the centre of the frame after releasing the respective quick releases.

13. A universal folding bicycle according to claim 1 wherein the seat can be swung to the centre of the frame after sliding out the telescopic stem or the telescopic stem with the seat swing arm with the attached telescopic seat springing or the seat arm springing.

14. A universal folding bicycle according to claim 1 wherein the back wheel together with the back swing arm or with the accessory arm can be swung to the centre of the frame after releasing the respective quick releases.

15. A universal folding bicycle according to claim 1 wherein the pedals with cranks located in the height of 260 to 350 mm from the ground can be removed after releasing the respective quick release.

16. A universal folding bicycle according to claim 1 wherein after folding, its size corresponds to a square with sides equal to the diameter of the front wheel with the front fender, or to the diameter of the back wheel with the back fender.

17. A universal folding bicycle according to claim 1 wherein it can be folded without using any instruments.

18. A universal folding bicycle according to claim 1 wherein:

the seat is located above a seat swing arm and is sprung by telescopic seat springing; and the telescopic seat springing is attached to an end of the frame.

19. A universal folding bicycle according to claim 18 wherein the back swing arm is equipped by an accessory arm.

20. A universal folding bicycle according to claim 18 wherein the height of the handlebars is adjustable by the means of the telescopic rod in the range of 600 to 1100 mm from the ground and 290 to 620 mm from the seat in the horizontal direction.

21. A universal folding bicycle according to claim 18 wherein the height of the frame at a traverse part is 150 to 780 mm from the ground.

22. A universal folding bicycle according to claim 18 wherein the seat is adjustable in the anterior-posterior horizontal direction in the range of 70 to 150 mm and 500 to 1100 from the ground in the vertical direction with springing from 55 to 125 mm from the ground.

* * * * *